(12) United States Patent
Glover

(10) Patent No.: US 10,783,326 B2
(45) Date of Patent: Sep. 22, 2020

(54) SYSTEM FOR TRACKING CHANGES IN A COLLABORATIVE DOCUMENT EDITING ENVIRONMENT

(71) Applicant: Workshare, Ltd., London (GB)

(72) Inventor: Robin Glover, London (GB)

(73) Assignee: WORKSHARE, LTD., London (GB)

( * ) Notice: Subject to any disclaimer, the term of this patent is extended or adjusted under 35 U.S.C. 154(b) by 606 days.

(21) Appl. No.: 13/830,023

(22) Filed: Mar. 14, 2013

(65) Prior Publication Data

US 2014/0281872 A1  Sep. 18, 2014

(51) Int. Cl.
*G06F 17/00* (2019.01)
*G06F 40/194* (2020.01)
*G06F 40/197* (2020.01)

(52) U.S. Cl.
CPC .......... *G06F 40/194* (2020.01); *G06F 40/197* (2020.01)

(58) Field of Classification Search
CPC ..... G06F 17/24; G06F 17/211; G06F 17/2288
USPC ........................................ 715/204, 229, 255
See application file for complete search history.

(56) References Cited

U.S. PATENT DOCUMENTS

| | | |
|---|---|---|
| 4,479,195 A | 10/1984 | Herr et al. |
| 4,853,961 A | 8/1989 | Pastor |
| 4,949,300 A | 8/1990 | Christenson et al. |
| 5,008,853 A | 4/1991 | Bly et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,315,504 A | 5/1994 | Lemble |
| 5,379,374 A | 1/1995 | Ishizaki et al. |
| 5,446,842 A | 8/1995 | Schaeffer et al. |
| 5,608,872 A | 3/1997 | Schwartz et al. |
| 5,617,539 A | 4/1997 | Ludwig et al. |
| 5,619,649 A | 4/1997 | Kovnat et al. |
| 5,634,062 A | 5/1997 | Shimizu et al. |
| 5,671,428 A | 9/1997 | Muranaga et al. |
| 5,673,316 A | 9/1997 | Auerbach et al. |
| 5,699,427 A | 12/1997 | Chow et al. |
| 5,745,879 A | 4/1998 | Wyman |
| 5,751,814 A | 5/1998 | Kafri |
| RE35,861 E | 7/1998 | Queen |

(Continued)

FOREIGN PATENT DOCUMENTS

| | | |
|---|---|---|
| JP | 10177650 | 6/1998 |
| JP | 2004265267 | 9/2004 |

(Continued)

OTHER PUBLICATIONS

Notice of Allowance dated Aug. 19, 2012 in Co-Pending U.S. Appl. No. 12/177,043, filed Jul. 21, 2008.

(Continued)

*Primary Examiner* — Stephen S Hong
*Assistant Examiner* — Matthew J Ludwig
(74) *Attorney, Agent, or Firm* — Nixon Peabody LLP

(57) ABSTRACT

This invention discloses a novel system and method for displaying electronic documents on remote devices and enabling collaborative editing where the system tracks revisions, comments and other content between versions of the document by maintaining hierarchical representation of the version and mapping locations between the hierarchies.

26 Claims, 7 Drawing Sheets

(56) References Cited

U.S. PATENT DOCUMENTS

| | | | |
|---|---|---|---|
| 5,787,175 A | 7/1998 | Carter | |
| 5,787,444 A | 7/1998 | Gerken et al. | |
| 5,801,702 A | 9/1998 | Dolan et al. | |
| 5,806,078 A | 9/1998 | Hug et al. | |
| 5,819,300 A | 10/1998 | Kohno et al. | |
| 5,832,494 A | 11/1998 | Egger et al. | |
| 5,850,219 A | 12/1998 | Kumomura | |
| 5,874,953 A | 2/1999 | Webster et al. | |
| 5,890,176 A * | 3/1999 | Kish et al. | 715/205 |
| 5,890,177 A * | 3/1999 | Moody et al. | 715/210 |
| 5,897,636 A | 4/1999 | Kaeser | |
| 5,898,836 A | 4/1999 | Frievald et al. | |
| 6,003,060 A | 12/1999 | Aznar et al. | |
| 6,009,173 A | 12/1999 | Sumner | |
| 6,012,087 A | 1/2000 | Frievald et al. | |
| 6,029,175 A | 2/2000 | Chow et al. | |
| 6,038,561 A | 3/2000 | Snyder et al. | |
| 6,049,804 A | 4/2000 | Burgess et al. | |
| 6,067,551 A | 5/2000 | Brown et al. | |
| 6,088,702 A | 7/2000 | Plantz et al. | |
| 6,128,635 A | 10/2000 | Ikeno | |
| 6,145,084 A | 11/2000 | Zuili et al. | |
| 6,169,976 B1 | 1/2001 | Colosso | |
| 6,189,019 B1 | 2/2001 | Blumer et al. | |
| 6,189,146 B1 | 2/2001 | Misra et al. | |
| 6,212,534 B1 | 4/2001 | Lo et al. | |
| 6,216,112 B1 | 4/2001 | Fuller et al. | |
| 6,219,652 B1 | 4/2001 | Carter et al. | |
| 6,219,818 B1 | 4/2001 | Frievald et al. | |
| 6,243,091 B1 | 6/2001 | Berstis | |
| 6,263,350 B1 | 7/2001 | Wollrath et al. | |
| 6,263,364 B1 | 7/2001 | Najork et al. | |
| 6,269,370 B1 | 7/2001 | Kirsch | |
| 6,285,999 B1 | 9/2001 | Page | |
| 6,301,368 B1 | 10/2001 | Bolle et al. | |
| 6,317,777 B1 | 11/2001 | Skarbo et al. | |
| 6,321,265 B1 | 11/2001 | Najork et al. | |
| 6,327,611 B1 | 12/2001 | Everingham | |
| 6,336,123 B2 | 1/2002 | Inoue et al. | |
| 6,351,755 B1 | 2/2002 | Najork et al. | |
| 6,356,937 B1 | 3/2002 | Montville et al. | |
| 6,377,984 B1 | 4/2002 | Najork et al. | |
| 6,404,446 B1 | 6/2002 | Bates et al. | |
| 6,418,433 B1 | 7/2002 | Chakrabarti et al. | |
| 6,418,453 B1 | 7/2002 | Kraft et al. | |
| 6,424,966 B1 | 7/2002 | Meyerzon et al. | |
| 6,449,624 B1 | 9/2002 | Hammack et al. | |
| 6,505,237 B2 | 1/2003 | Beyda et al. | |
| 6,513,050 B1 | 1/2003 | Williams et al. | |
| 6,547,829 B1 | 4/2003 | Meyerzon et al. | |
| 6,556,982 B1 | 4/2003 | McGaffey et al. | |
| 6,560,620 B1 | 5/2003 | Ching | |
| 6,584,466 B1 | 6/2003 | Serbinis et al. | |
| 6,591,289 B1 | 7/2003 | Britton | |
| 6,594,662 B1 | 7/2003 | Sieffert et al. | |
| 6,596,030 B2 | 7/2003 | Ball et al. | |
| 6,614,789 B1 | 9/2003 | Yazdani et al. | |
| 6,658,626 B1 | 12/2003 | Aiken | |
| 6,662,212 B1 | 12/2003 | Chandhok et al. | |
| 6,738,762 B1 | 5/2004 | Chen et al. | |
| 6,745,024 B1 | 6/2004 | DeJaco et al. | |
| 6,832,202 B1 | 12/2004 | Schuyler et al. | |
| 6,918,082 B1 | 7/2005 | Gross | |
| 7,035,427 B2 | 4/2006 | Rhoads | |
| 7,085,735 B1 | 8/2006 | Hall et al. | |
| 7,107,518 B2 | 9/2006 | Ramaley et al. | |
| 7,113,615 B2 | 9/2006 | Rhoads et al. | |
| 7,152,019 B2 | 12/2006 | Tarantola et al. | |
| 7,181,492 B2 | 2/2007 | Wen et al. | |
| 7,194,761 B1 | 3/2007 | Champagne | |
| 7,212,955 B2 | 5/2007 | Kirshenbaum et al. | |
| 7,233,686 B2 | 6/2007 | Hamid | |
| 7,240,207 B2 | 7/2007 | Weare | |
| 7,299,504 B1 | 11/2007 | Tiller et al. | |
| 7,321,864 B1 | 1/2008 | Gendler | |
| 7,353,455 B2 | 4/2008 | Malik | |
| 7,356,704 B2 | 4/2008 | Rinkevich et al. | |
| 7,434,164 B2 | 10/2008 | Salesin et al. | |
| 7,454,778 B2 | 11/2008 | Pearson et al. | |
| 7,496,841 B2 | 2/2009 | Hadfield et al. | |
| 7,564,997 B2 | 7/2009 | Hamid | |
| 7,570,964 B2 | 8/2009 | Maes | |
| 7,613,770 B2 | 11/2009 | Li | |
| 7,624,447 B1 | 11/2009 | Horowitz et al. | |
| 7,627,613 B1 | 12/2009 | Dulitz et al. | |
| 7,640,308 B2 | 12/2009 | Antonoff et al. | |
| 7,673,324 B2 | 3/2010 | Tirosh et al. | |
| 7,680,785 B2 | 3/2010 | Najork | |
| 7,685,298 B2 | 3/2010 | Day | |
| 7,694,336 B2 | 4/2010 | Rinkevich et al. | |
| 7,707,153 B1 | 4/2010 | Petito et al. | |
| 7,720,256 B2 | 5/2010 | Desprez et al. | |
| 7,730,175 B1 | 6/2010 | Roesch et al. | |
| 7,788,235 B1 | 8/2010 | Yeo | |
| 7,796,309 B2 * | 9/2010 | Sadovsky et al. | 358/474 |
| 7,797,724 B2 | 9/2010 | Calvin | |
| 7,818,678 B2 * | 10/2010 | Massand | G06F 17/2229 715/751 |
| 7,844,116 B2 | 11/2010 | Monga | |
| 7,857,201 B2 | 12/2010 | Silverbrook et al. | |
| 7,877,790 B2 | 1/2011 | Vishik et al. | |
| 7,890,752 B2 | 2/2011 | Bardsley et al. | |
| 7,895,166 B2 | 2/2011 | Foygel et al. | |
| 7,895,276 B2 | 2/2011 | Massand | |
| 7,903,822 B1 | 3/2011 | Hair et al. | |
| 7,941,844 B2 | 5/2011 | Anno | |
| 7,958,101 B1 | 6/2011 | Teugels et al. | |
| 8,005,277 B2 | 8/2011 | Tulyakov et al. | |
| 8,042,112 B1 | 10/2011 | Zhu et al. | |
| 8,060,575 B2 | 11/2011 | Massand | |
| 8,140,513 B2 | 3/2012 | Ghods | |
| 8,145,724 B1 | 3/2012 | Hawks et al. | |
| 8,181,036 B1 | 5/2012 | Nachenberg | |
| 8,196,030 B1 * | 6/2012 | Wang et al. | 715/200 |
| 8,201,254 B1 | 6/2012 | Wilhelm et al. | |
| 8,209,538 B2 | 6/2012 | Craigie | |
| 8,233,723 B2 | 7/2012 | Sundaresan | |
| 8,286,085 B1 | 10/2012 | Denise | |
| 8,286,171 B2 | 10/2012 | More et al. | |
| 8,316,237 B1 | 11/2012 | Felsher et al. | |
| 8,326,814 B2 | 12/2012 | Ghods | |
| 8,381,104 B2 | 2/2013 | Massand | |
| 8,406,456 B2 | 3/2013 | More | |
| 8,471,781 B2 | 6/2013 | Massand | |
| 8,473,847 B2 | 6/2013 | Glover | |
| 8,478,995 B2 | 7/2013 | Alculumbre | |
| 8,555,080 B2 | 10/2013 | More et al. | |
| 8,620,020 B2 | 12/2013 | More | |
| 8,620,872 B1 | 12/2013 | Killalea | |
| 8,635,295 B2 | 1/2014 | Mulder | |
| 8,670,600 B2 | 3/2014 | More | |
| 8,732,127 B1 | 5/2014 | Rotterdam et al. | |
| 8,776,190 B1 | 7/2014 | Cavage et al. | |
| 8,797,603 B1 | 8/2014 | Dougherty et al. | |
| 8,839,100 B1 | 9/2014 | Donald | |
| 8,977,697 B2 | 3/2015 | Massand | |
| 9,098,500 B1 | 8/2015 | Asokan et al. | |
| 9,311,624 B2 | 4/2016 | Diament et al. | |
| 9,652,485 B1 | 5/2017 | Bhargava et al. | |
| 2001/0018739 A1 | 8/2001 | Anderson et al. | |
| 2001/0042073 A1 | 11/2001 | Saether et al. | |
| 2002/0010682 A1 | 1/2002 | Johnson | |
| 2002/0016959 A1 | 2/2002 | Barton et al. | |
| 2002/0019827 A1 | 2/2002 | Shiman et al. | |
| 2002/0023158 A1 | 2/2002 | Polizzi et al. | |
| 2002/0052928 A1 | 5/2002 | Stern et al. | |
| 2002/0063154 A1 | 5/2002 | Hoyos et al. | |
| 2002/0065827 A1 | 5/2002 | Christie et al. | |
| 2002/0065848 A1 | 5/2002 | Walker et al. | |
| 2002/0073188 A1 | 6/2002 | Rawson | |
| 2002/0087515 A1 | 7/2002 | Swannack et al. | |
| 2002/0099602 A1 | 7/2002 | Moskowitz et al. | |
| 2002/0120648 A1 | 8/2002 | Ball et al. | |
| 2002/0129062 A1 | 9/2002 | Luparello | |

(56) References Cited

U.S. PATENT DOCUMENTS

| | | |
|---|---|---|
| 2002/0136222 A1 | 9/2002 | W. Robohm |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0009518 A1 | 1/2003 | Harrow et al. |
| 2003/0009528 A1 | 1/2003 | Sharif et al. |
| 2003/0037010 A1 | 2/2003 | Schmelzer |
| 2003/0046572 A1 | 3/2003 | Newman et al. |
| 2003/0046639 A1 | 3/2003 | Fai et al. |
| 2003/0051054 A1 | 3/2003 | Redlich et al. |
| 2003/0061260 A1 | 3/2003 | Rajkumar |
| 2003/0061350 A1 | 3/2003 | Masuoka et al. |
| 2003/0078880 A1 | 4/2003 | Alley et al. |
| 2003/0084279 A1 | 5/2003 | Campagna |
| 2003/0093755 A1 | 5/2003 | O'Carroll |
| 2003/0097454 A1 | 5/2003 | Yamakawa et al. |
| 2003/0112273 A1 | 6/2003 | Hadfield et al. |
| 2003/0115273 A1 | 6/2003 | Delia et al. |
| 2003/0121008 A1* | 6/2003 | Tischer .......... 715/530 |
| 2003/0131005 A1 | 7/2003 | Berry |
| 2003/0147267 A1 | 8/2003 | Huttunen |
| 2003/0158839 A1 | 8/2003 | Faybishenko |
| 2003/0191799 A1 | 10/2003 | Araujo et al. |
| 2003/0196087 A1 | 10/2003 | Stringer et al. |
| 2003/0223624 A1 | 12/2003 | Hamid |
| 2003/0233419 A1 | 12/2003 | Beringer |
| 2003/0237047 A1* | 12/2003 | Borson ............ G06F 17/2247 715/229 |
| 2004/0002049 A1 | 1/2004 | Beavers et al. |
| 2004/0031052 A1 | 2/2004 | Wannamaker et al. |
| 2004/0122659 A1 | 6/2004 | Hourihane et al. |
| 2004/0128321 A1 | 7/2004 | Hamer |
| 2004/0148567 A1 | 7/2004 | Jeon et al. |
| 2004/0186851 A1 | 9/2004 | Jhingan et al. |
| 2004/0187076 A1 | 9/2004 | Ki |
| 2004/0225645 A1 | 11/2004 | Rowney et al. |
| 2004/0261016 A1 | 12/2004 | Glass et al. |
| 2005/0021637 A1 | 1/2005 | Cox |
| 2005/0021980 A1 | 1/2005 | Kanai |
| 2005/0027704 A1 | 2/2005 | Hammond et al. |
| 2005/0038893 A1 | 2/2005 | Graham |
| 2005/0055306 A1 | 3/2005 | Miller et al. |
| 2005/0055337 A1 | 3/2005 | Bebo et al. |
| 2005/0071755 A1* | 3/2005 | Harrington ........ G06F 17/2288 715/229 |
| 2005/0086525 A1 | 4/2005 | Cirulli et al. |
| 2005/0108293 A1 | 5/2005 | Lipman et al. |
| 2005/0138350 A1 | 6/2005 | Hariharan |
| 2005/0138540 A1 | 6/2005 | Baltus et al. |
| 2005/0204008 A1 | 9/2005 | Shinbrood |
| 2005/0251738 A1 | 11/2005 | Hirano et al. |
| 2005/0251748 A1 | 11/2005 | Gusmorino et al. |
| 2005/0256893 A1 | 11/2005 | Perry |
| 2005/0268327 A1 | 12/2005 | Starikov |
| 2005/0278421 A1 | 12/2005 | Simpson et al. |
| 2006/0005247 A1 | 1/2006 | Zhang et al. |
| 2006/0013393 A1 | 1/2006 | Ferchichi et al. |
| 2006/0020520 A1 | 1/2006 | Lange et al. |
| 2006/0021031 A1 | 1/2006 | Leahy et al. |
| 2006/0047765 A1 | 3/2006 | Mizoi et al. |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0069605 A1 | 3/2006 | Hatoun |
| 2006/0069740 A1 | 3/2006 | Ando |
| 2006/0112120 A1 | 5/2006 | Rohall |
| 2006/0129592 A1 | 6/2006 | Poozhiyil et al. |
| 2006/0129627 A1 | 6/2006 | Phillips |
| 2006/0158676 A1 | 7/2006 | Hamada |
| 2006/0171588 A1 | 8/2006 | Chellapilla et al. |
| 2006/0184505 A1 | 8/2006 | Kedem |
| 2006/0190493 A1 | 8/2006 | Kawai et al. |
| 2006/0218004 A1 | 9/2006 | Dworkin et al. |
| 2006/0218643 A1 | 9/2006 | DeYoung |
| 2006/0224589 A1 | 10/2006 | Rowney |
| 2006/0236246 A1 | 10/2006 | Bono et al. |
| 2006/0259524 A1 | 11/2006 | Horton |
| 2006/0259949 A1 | 11/2006 | Schaefer et al. |
| 2006/0261112 A1 | 11/2006 | Gates et al. |
| 2006/0271947 A1 | 11/2006 | Lienhart et al. |
| 2006/0272024 A1 | 11/2006 | Huang et al. |
| 2006/0277229 A1 | 12/2006 | Yoshida et al. |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0011211 A1 | 1/2007 | Reeves |
| 2007/0025265 A1 | 2/2007 | Porras et al. |
| 2007/0027830 A1 | 2/2007 | Simons et al. |
| 2007/0038704 A1 | 2/2007 | Brown et al. |
| 2007/0094510 A1 | 4/2007 | Ross et al. |
| 2007/0100991 A1 | 5/2007 | Daniels et al. |
| 2007/0112854 A1 | 5/2007 | Franca |
| 2007/0112930 A1 | 5/2007 | Foo et al. |
| 2007/0118598 A1 | 5/2007 | Bedi et al. |
| 2007/0141641 A1 | 6/2007 | Fang |
| 2007/0150443 A1 | 6/2007 | Bergholz et al. |
| 2007/0156785 A1 | 7/2007 | Hines et al. |
| 2007/0179967 A1 | 8/2007 | Zhang |
| 2007/0192728 A1 | 8/2007 | Finley et al. |
| 2007/0220061 A1 | 9/2007 | Tirosh et al. |
| 2007/0220068 A1* | 9/2007 | Thompson et al. .......... 707/203 |
| 2007/0261099 A1 | 11/2007 | Broussard et al. |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2007/0299880 A1 | 12/2007 | Kawabe et al. |
| 2008/0022003 A1 | 1/2008 | Alve |
| 2008/0028017 A1 | 1/2008 | Garbow et al. |
| 2008/0033913 A1 | 2/2008 | Winburn |
| 2008/0034282 A1 | 2/2008 | Zernik |
| 2008/0034327 A1 | 2/2008 | Cisler et al. |
| 2008/0040388 A1 | 2/2008 | Petri |
| 2008/0046518 A1 | 2/2008 | Tonnison et al. |
| 2008/0065668 A1* | 3/2008 | Spence ................ G06F 9/4446 |
| 2008/0080515 A1 | 4/2008 | Tombroff |
| 2008/0082529 A1 | 4/2008 | Mantena et al. |
| 2008/0082930 A1 | 4/2008 | Omernick et al. |
| 2008/0091465 A1 | 4/2008 | Fuschino et al. |
| 2008/0091735 A1 | 4/2008 | Fukushima et al. |
| 2008/0094370 A1 | 4/2008 | Ording et al. |
| 2008/0162527 A1 | 7/2008 | Pizano et al. |
| 2008/0177782 A1 | 7/2008 | Poston et al. |
| 2008/0178076 A1 | 7/2008 | Kritt et al. |
| 2008/0209001 A1 | 8/2008 | Boyle et al. |
| 2008/0215667 A1 | 9/2008 | Rothbarth et al. |
| 2008/0219495 A1 | 9/2008 | Hulten et al. |
| 2008/0235760 A1 | 9/2008 | Broussard et al. |
| 2008/0263363 A1 | 10/2008 | Jueneman et al. |
| 2008/0275694 A1 | 11/2008 | Varone |
| 2008/0288597 A1 | 11/2008 | Christensen et al. |
| 2008/0301193 A1 | 12/2008 | Massand |
| 2008/0306894 A1 | 12/2008 | Rajkumar et al. |
| 2008/0310624 A1 | 12/2008 | Celikkan |
| 2008/0320316 A1 | 12/2008 | Waldspurger |
| 2009/0019051 A1 | 1/2009 | Winburn |
| 2009/0025087 A1 | 1/2009 | Peirson et al. |
| 2009/0030997 A1 | 1/2009 | Malik |
| 2009/0034804 A1 | 2/2009 | Cho et al. |
| 2009/0037520 A1 | 2/2009 | Loffredo |
| 2009/0049132 A1 | 2/2009 | Gutovski |
| 2009/0052778 A1 | 2/2009 | Edgecomb et al. |
| 2009/0064326 A1 | 3/2009 | Goldstein |
| 2009/0070128 A1 | 3/2009 | McCauley et al. |
| 2009/0083073 A1 | 3/2009 | Mehta et al. |
| 2009/0083384 A1 | 3/2009 | Bhogal et al. |
| 2009/0094530 A1 | 4/2009 | Champlain et al. |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0187567 A1 | 7/2009 | Rolle |
| 2009/0216843 A1 | 8/2009 | Willner et al. |
| 2009/0222450 A1 | 9/2009 | Zigelman |
| 2009/0234863 A1 | 9/2009 | Evans |

(56) References Cited

U.S. PATENT DOCUMENTS

| | | |
|---|---|---|
| 2009/0235760 A1 | 9/2009 | Broussard et al. |
| 2009/0241187 A1 | 9/2009 | Troyansky |
| 2009/0271620 A1 | 10/2009 | Sudhakar |
| 2009/0319480 A1 | 12/2009 | Saito |
| 2010/0011077 A1 | 1/2010 | Shkolnikov et al. |
| 2010/0011428 A1 | 1/2010 | Atwood et al. |
| 2010/0017404 A1 | 1/2010 | Banerjee et al. |
| 2010/0017478 A1 | 1/2010 | Meija et al. |
| 2010/0017850 A1 | 1/2010 | More et al. |
| 2010/0049807 A1 | 2/2010 | Thompson |
| 2010/0058053 A1 | 3/2010 | Wood et al. |
| 2010/0064004 A1 | 3/2010 | Ravi et al. |
| 2010/0064372 A1 | 3/2010 | More |
| 2010/0070448 A1 | 3/2010 | Omoigui |
| 2010/0076985 A1 | 3/2010 | Egnor |
| 2010/0114985 A1 | 5/2010 | Chaudhary et al. |
| 2010/0114991 A1 | 5/2010 | Chaudhary et al. |
| 2010/0124354 A1 | 5/2010 | More |
| 2010/0131604 A1 | 5/2010 | Portilla |
| 2010/0146382 A1 | 6/2010 | Abe et al. |
| 2010/0174678 A1 | 7/2010 | Massand |
| 2010/0174761 A1 | 7/2010 | Longobardi et al. |
| 2010/0186062 A1 | 7/2010 | Banti et al. |
| 2010/0217987 A1 | 8/2010 | Shevade |
| 2010/0235763 A1 | 9/2010 | Massand |
| 2010/0241943 A1 | 9/2010 | Massand |
| 2010/0251104 A1 | 9/2010 | Massand |
| 2010/0257352 A1 | 10/2010 | Errico |
| 2010/0274765 A1 | 10/2010 | Murphy et al. |
| 2010/0287246 A1 | 11/2010 | Klos et al. |
| 2010/0299727 A1 | 11/2010 | More et al. |
| 2010/0318530 A1 | 12/2010 | Massand |
| 2010/0332428 A1 | 12/2010 | McHenry et al. |
| 2010/0332682 A1 | 12/2010 | Sharp et al. |
| 2011/0029625 A1 | 2/2011 | Cheng et al. |
| 2011/0035655 A1 | 2/2011 | Heineken |
| 2011/0041165 A1 | 2/2011 | Bowen |
| 2011/0106892 A1 | 5/2011 | Nelson et al. |
| 2011/0107106 A1 | 5/2011 | Morii et al. |
| 2011/0125806 A1 | 5/2011 | Park |
| 2011/0141521 A1 | 6/2011 | Qiao |
| 2011/0145229 A1 | 6/2011 | Vailaya et al. |
| 2011/0154180 A1 | 6/2011 | Evanitsky et al. |
| 2011/0173103 A1 | 7/2011 | Batra et al. |
| 2011/0197121 A1 | 8/2011 | Kletter |
| 2011/0225646 A1 | 9/2011 | Crawford |
| 2011/0252098 A1 | 10/2011 | Kumar |
| 2011/0252310 A1 | 10/2011 | Rahaman et al. |
| 2011/0264907 A1 | 10/2011 | Betz et al. |
| 2011/0276658 A1 | 11/2011 | Massand |
| 2011/0283177 A1 | 11/2011 | Gates et al. |
| 2011/0314384 A1 | 12/2011 | Lindgren et al. |
| 2012/0011361 A1 | 1/2012 | Guerrero et al. |
| 2012/0016867 A1 | 1/2012 | Clemm et al. |
| 2012/0030563 A1 | 2/2012 | Lemonik et al. |
| 2012/0036157 A1 | 2/2012 | Rolle |
| 2012/0079267 A1 | 3/2012 | Lee |
| 2012/0079596 A1 | 3/2012 | Thomas et al. |
| 2012/0110092 A1 | 5/2012 | Keohane et al. |
| 2012/0117096 A1 | 5/2012 | Massand |
| 2012/0117644 A1 | 5/2012 | Soeder |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1 | 5/2012 | Mulder |
| 2012/0136952 A1 | 5/2012 | Mulder |
| 2012/0151316 A1 | 6/2012 | Massand |
| 2012/0173881 A1 | 7/2012 | Trotter |
| 2012/0185511 A1 | 7/2012 | Mansfield et al. |
| 2012/0246115 A1 | 9/2012 | King et al. |
| 2012/0260188 A1 | 10/2012 | Park et al. |
| 2012/0265817 A1 | 10/2012 | Vidalenc et al. |
| 2012/0317239 A1 | 12/2012 | Mulder |
| 2012/0317414 A1 | 12/2012 | Glover |
| 2012/0317479 A1 | 12/2012 | Safa |
| 2012/0324369 A1 | 12/2012 | Safa |
| 2013/0007070 A1 | 1/2013 | Pitschke |
| 2013/0060799 A1 | 3/2013 | Massand |
| 2013/0074195 A1 | 3/2013 | Johnston et al. |
| 2013/0074198 A1 | 3/2013 | More |
| 2013/0097421 A1 | 4/2013 | Lim |
| 2013/0212707 A1 | 8/2013 | Donahue et al. |
| 2013/0227043 A1 | 8/2013 | Murakami |
| 2013/0227397 A1 | 8/2013 | Tvorun et al. |
| 2013/0246901 A1 | 9/2013 | Massand |
| 2013/0254536 A1 | 9/2013 | Glover |
| 2013/0290867 A1 | 10/2013 | Massand |
| 2014/0032489 A1 | 1/2014 | Hebbar et al. |
| 2014/0115066 A1 | 4/2014 | Massand |
| 2014/0115436 A1* | 4/2014 | Beaver ............... G06F 17/2288 715/229 |
| 2014/0136497 A1 | 5/2014 | Georgiev et al. |
| 2014/0181223 A1 | 6/2014 | Homsany et al. |
| 2014/0279843 A1 | 9/2014 | Von Weihe |
| 2014/0280336 A1 | 9/2014 | Glover |
| 2014/0281872 A1* | 9/2014 | Glover ............... G06F 17/2211 715/229 |
| 2015/0026464 A1 | 1/2015 | Hanner et al. |
| 2015/0033283 A1 | 1/2015 | Mulder |
| 2015/0172058 A1 | 6/2015 | Follis |
| 2016/0350270 A1 | 12/2016 | Nakazawa |

FOREIGN PATENT DOCUMENTS

| | | |
|---|---|---|
| JP | 2007299364 | 11/2007 |
| KR | 1020010078840 | 8/2001 |
| KR | 20040047413 | 6/2004 |
| KR | 1020040047413 | 6/2004 |
| KR | 1020060048686 | 5/2006 |
| KR | 0049518 | 5/2007 |
| KR | 200070049518 | 5/2007 |
| KR | 1020070049518 | 5/2007 |
| KR | 102008002960 | 4/2008 |
| KR | 1020080029602 | 4/2008 |
| WO | 2000060504 | 10/2000 |
| WO | WO0060504 | 10/2000 |
| WO | 2001052473 | 7/2001 |
| WO | 2001052473 A1 | 7/2001 |
| WO | 2002101577 | 12/2002 |
| WO | 2002101577 A1 | 12/2002 |

OTHER PUBLICATIONS

Notice of Allowance dated Jun. 26, 2012 in Co-Pending U.S. Appl. No. 12/275,185, filed Nov. 20, 2008.

Notice of Allowance dated Sep. 25, 2013 in Co-Pending U.S. Appl. No. 13/659,817 by More, S., filed Oct. 24, 2012.

Non-Final Office Action dated Aug. 13, 2013 in co-pending U.S. Appl. No. 13/306,819 by Glover, R.W., filed Nov. 29, 2011.

Non-Final Office Action dated May 17, 2013 in co-pending U.S. Appl. No. 13/306,765 by Mulder, S.P.M, filed Nov. 29, 2011.

Final Office Action dated Aug. 16, 2013 in co-pending U.S. Appl. No. 13/306,798 of Glover, R.W., filed Nov. 29, 2011.

Non-Final Office Action dated May 7, 2008 in Co-Pending U.S. Appl. No. 10/023,010, filed Dec. 17, 2001, now U.S. Pat. No. 7,496,841.

Non-Final Office Action dated Apr. 26, 2013 in Co-Pending U.S. Appl. No. 13/659,817 by More, S., filed Oct. 24, 2012.

Non-Final Office Action dated Sep. 19, 2012 in Co-Pending U.S. Appl. No. 12/844,818 by Glover, R., filed Jul. 27, 2010.

Non-final office action issued for U.S. Appl. No. 13/799,067 dated Oct. 30, 2014.

Non-Final Office Action dated Mar. 18, 2013 in Co-Pending U.S. Appl. No. 13/659,793 by More, S., filed Oct. 24, 2012.

Non-Final Office Action dated Mar. 20, 2006 in Co-pending U.S. Appl. No. 10/136,733, filed Apr. 30, 2002.

Non-Final Office Action dated Mar. 16, 2006 for U.S. Appl. No. 10/023,010, filed Dec. 17, 2001, now U.S. Pat. No. 7,496,841.

Non-Final Office Action dated Sep. 19, 2011 for U.S. Appl. No. 12/177,043, filed Jul. 21, 2008.

(56) References Cited

OTHER PUBLICATIONS

Final Office Action dated Feb. 1, 2013 in Co-Pending U.S. Appl. No. 12/621,429 by More, S., filed Nov. 18, 2009.
Final Office Action dated May 10, 2012 in Co-Pending U.S. Appl. No. 12/209,082, filed Sep. 11, 2008.
Final Office Action dated Apr. 16, 2012 in Co-Pending U.S. Appl. No. 12/177,043, filed Jul. 21, 2008.
Final Office Action dated Aug. 12, 2011 for U.S. Appl. No. 12/209,096, filed Sep. 11, 2008.
Final Office Action dated Apr. 17, 2007 for U.S. Appl. No. 10/023,010, filed Dec. 17, 2001, now U.S. Pat. No. 7,496,841.
Non-Final Office Action dated Mar. 11, 2011, in Co-pending U.S. Appl. No. 12/209,096, filed Sep. 11, 2008.
Non-Final Office Action dated Jan. 9, 2012 in Co-Pending U.S. Appl. No. 12/177,043, filed Jul. 21, 2008.
Final Office Action dated Jan. 18, 2013 in Co-Pending U.S. Appl. No. 12/844,818 by Glover, R., filed Jul. 27, 2010.
Non-Final Office Action dated Dec. 22, 2011 in Co-Pending U.S. Appl. No. 12/209,082, filed Sep. 11, 2008.
Final Office Action dated Oct. 21, 2013, in Co-Pending U.S. Appl. No. 13/659,793 by More, S., filed Oct. 24, 2012.
Non-Final Office Action dated Dec. 6, 2012 in co-pending U.S. Appl. No. 13/306,798, filed Nov. 29, 2011.
Non-Final Office Action dated Apr. 27, 2012 in Co-Pending U.S. Appl. No. 12/275,043, filed Jul. 21, 2008.
Cox et al; Microsoft Office Word 2007 Step by Step; Jan. 17, 2007; Microsoft Press; pp. 283-293.
Prinz, Wolfgang, and Sabine Kolvenbach. "Support for workflows in a ministerial environment." Computer Supported Cooperative Work: Proceedings of the 1996 ACM conference on Computer supported cooperative work, vol. 16, No. 20, 1996; pp. 2-4, 8.
Howard, Pamela O. Prototype Message Dissemination System and Document Routing System for an Army Organization. Arizona Univ Tucson, 1990; pp. 7-9.
Stephen Voida et al., Share and Share Alike: Exploring the User Interface Affordances of File Sharing, Apr. 22-27, 2006, ACM, pp. 1-10.
Dominik Grolmund et al., Cryptree: A Folder Tree Structure for Cryptographic File Systems, Oct. 2-4, 2006, IEEE, pp. 189-198.
Nathanial S. Good et al., Usability and privacy: a study of KaZaA P2P file-sharing, Apr. 5-10, 2003, ACM, vol. No. 5, Issue No. 1, pp. 137-144.
M. Eric Johnson et al., The Evolution of the Peer-to-Peer File Sharing Industry and the Security Risks for Users, Jan. 7-10, 2008, IEEE, pp. 1-10.
Weiss et al., Lightweight document matching for help-desk applications, In; Intelligent Systems and their Applications, IEEE, Vo. 15, Issue:2, pp. 57-61, ISSN 1094-7167, 2000.
PC Magazine "Pure Intranets: Real-Time Internet Collboration", http://www.zdnet.com/pcmag/featuresgroupware/gpwst.htm, Aug. 30, 2001, 2 pages.
Wells et al., "Groupware & Collaboration Support", www.objs.com/survey/groupwar.htm, Aug. 30, 2001, 10 pages.
Tsai, et al., "A Document Workspace for Collaboration and Annotation based on XML Technology", IEEE, 2000, pp. 165-172.
Roussev, et al., "Integrating XML and Object-based Programming for Distributed Collaboration", IEEE, 2000, pp. 254-259.
XP-002257904, "Workshare Debuts Synergy", 2003, 3 pages.
Microsoft, "Microsoft XP, Product Guide", Aug. 24, 2001, pp. 1-26, Microsoft.
Monga, et al., "Perceptual Image Hashing via Feature Points: Performance Evaluation and Tradeoffs," IEEE Transactions on Image Processing, vol. 15, No. 11, Nov. 2006, pp. 3453-3466.
Monga, "Robust Perceptual Image Hashing Using Feature Points," http://bluecoat-o2/?cfru=aHR0cDovL3NpZ25hbC51Y2UudXrleGFzLmVkdS9+dmlzaGFsL2hhc2gtGFydEkucHM=, 2003.
Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.

Xuefeng Liang; et al., "Fingerprint Matching Using Minutia Polygons," Pattern Recognition, 2006, ICPR 2006, 18th International Conference on, vol. 1, No., pp. 1046-1049.
Sujoy Roy, et al., "Robust Hash for Detecting and Localizing Image Tampering," Image Processing, 2007, ICIP 2007, IEEE International Conference on, vol. 6, No., pp. VI-117-VI-120, Sep. 16, 2007-Oct. 19, 2007.
Yung, et al., "Generating Robust Digital Signature for Image/Video Authentication," Multimedia and Security Workshop at ACM Multimedia '98, Bristol, U.K., Sep. 1998.
International Search Report of PCT Application No. PCT/US2009/056651, dated Apr. 21, 2010, pp. 1-3.
International Search Report of PCT Application No. PCT/US2009/065019 dated Jun. 4, 2010, pp. 1-6.
International Search Report of PCT Application No. PCT/US2009/056668 dated Apr. 16, 2010, pp. 1-9.
International Search Report of PCT Application No. PCT/US2009/051313, dated Mar. 3, 2010, 3 pages.
International Search Report of PCT Application No. PCT/US2009/064919 dated Jul. 1, 2010, pp. 1-3.
International Search Report of PCT Application No. PCT/US2010/043345, dated Apr. 28, 2011, 3 pages.
International Search Report of PCT Application No. PCT/IB2002/005821, dated Jan. 3, 2004, 6 pages.
Written Opinion PCT Application No. PCT/US2009/056651, dated Apr. 21, 2010, pp. 1-5.
Written Opinion PCT Application No. PCT/US2009/065019 dated Jun. 4, 2010, pp. 1-5.
Written Opinion PCT Application No. PCT/US2009/056668 dated Apr. 16, 2010, pp. 1-4.
Written Opinion of PCT Application No. PCT/US2009/051313, dated Mar. 3, 2010, 4 pages.
Written Opinion PCT Application No. PCT/US2009/064919 dated Jul. 1, 2010, pp. 1-4.
Written Opinion PCT Application No. PCT/US2010/043345 dated Apr. 28, 2011, 4 pages.
Advisory Action dated Apr. 12, 2013, in Co-Pending U.S. Appl. No. 12/621,429 by More, S., filed Nov. 18, 2009.
Advisory Action dated Nov. 1, 2013, in Co-Pending U.S. Appl. No. 13/659,793 by More, S., filed Oct. 24, 2012.
Restriction Requirement dated Feb. 14, 2005 for U.S. Appl. No. 10/023,010, filed Dec. 17, 2001, now U.S. Pat. No. 7,496,841.
Restriction Requirement dated Jun. 30, 2006 for U.S. Appl. No. 10/136,733, filed Apr. 30, 2002.
Non-Final Office Action dated Aug. 1, 2012 in Co-Pending U.S. Appl. No. 12/621,429, filed Nov. 18, 2009.
Restriction Requirement dated Feb. 5, 2008 for U.S. Appl. No. 10/023,010, filed Dec. 17, 2001, now U.S. Pat. No. 7,496,841.
Notice of Allowance dated Jul. 8, 2013 in Co-Pending U.S. Appl. No. 12/209,082 by S. More et al. filed Sep. 11, 2008.
Notice of Allowance dated Oct. 24, 2008 in Co-pending U.S. Appl. No. 10/023,010, filed Dec. 17, 2001.
Notice of Allowance dated Oct. 2, 2012 in Co-Pending U.S. Appl. No. 12/275,185 by More, S., filed Nov. 20, 2008.
Notice of Allowance dated Mar. 13, 2013 in Co-Pending U.S. Appl. No. 12/844,818 by Glover, R., filed Jul. 27, 2010.
Jamison, Scott. Essential SharePoint 2010: Overview, Governance, and Planning. Addison-Wesley Professional; 1 edition (Aug. 22, 2010).
Lightfoot, Johnathan and Beckett, Chris. Plain & Simple Microsoft® SharePoint® 2010. O'Reilly Media, Inc. Copyright © 2010.
Londer, Olga and Coventry, Penelope. Step by Step Microsoft® SharePoint® Foundation 2010. Microsoft Press. ISBN: 978-0-7356-2726-0. Copyright © 2011.
Pattison, Ted et al. Inside Microsoft® SharePoint® 2010. Critical Path Training, LLC © 2011.
Sahil Malik. Microsoft SharePoint 2010: Building Solutions for SharePoint 2010 . Apress; 1st ed. edition (Jun. 7, 2010).
Cawood, Stephen. How to Do Everything™ Microsoft® SharePoint® 2010. McGraw-Hill, 2010. ISBN 978-0-07-174367-9 (pbk). Copyright © 2010.

(56) References Cited

OTHER PUBLICATIONS

Microsoft SharePoint 2010 SDK: Building Block: Files and Documents, msn.microsoft.com (Nov. 1, 2010), https://msdn.microsoft.com/en-us/library/office/ee538269(v=office.14).aspx, (last visited Feb. 27, 2017).
Microsoft SharePoint 2010 SDK: How to: Upload a File to a SharePoint Site from a Local Folders, msn.microsoft.com (Jul. 7, 2010), https://msdn.microsoft.com/en-us/library/office/ms454491(v=office.14).aspx, (last visited Feb. 27, 2017).
Microsoft SharePoint 2010 White Paper , Microsoft.com, www.microsoft.com/downloads/en/details.aspx?familyid=5c562f71-3aa9-46fd-abac-7d381813f2b8 (Sep. 2010), www.microsoft.com/downloads/en/details.aspx?FamilyID=5c562f71-3aa9-46fd-abac-7d381813f2b8 (last visited Feb. 27, 2017).
Office Web Apps Overview (Installed on SharePoint 2010 Products), Technet.Microsoft.com (Jun. 11, 2010), https://technet.microsoft.com/en-us/library/ff431685(v=office.14).aspx, (last visited Feb. 27, 2017).
User Permissions and Permission Levels (SharePoint Foundation 2010)(technet.microsoft.com) (Jan. 4, 2011), https://technet.microsoft.com/en-us/library/cc288074(v=office.14).aspx (last visited Feb. 27, 2017).
Bettenburg et al., An Empirical Study on the Risks of Using Off-the-Shelf Techniques for Processing Mailing List Data, 2009, IEEE 4 pages.
Bindu et al., Spam War: Battling Ham against Spam, 2011 IEEE 6 pages.
Bobba et al. Attribute-Based Messaging: Access Control and Confidentiality, 2010, ACM 35 pages.
Chen et al., Online Detection and Prevention of Phishing Attacks, 2006, IEEE 7 pages.
Kamouskos et al., Active Electronic Mail, 2002, ACM 6 pages.
Kaushik et al., Email Feedback: A Policy based Approach to Overcoming False Positives, 2005, 10 pages.
Stolfo et al., AMT?MET: Systems for Modeling and Detecting Errant Email. 2003, IEEE 6 pages.
"3BClean".
"EzClean—Metadata removal utility for Microsoft Office".
"MIMEsweeper Solutions".
"CS MAILsweeper™ 4.3 for SMTP" by Clearswift Ltd (© 2002).
"EzClean—New Features—version 3.3".
"EzClean 3.2—New Features".
"EzClean FAQ".
"How do I make sure that there is no embarrassing Metadata in any documents that I attach to e-mails? ezClean makes it easy!"
"Lotus Announces cc:Mail for the World Wide Web; Provides EasyAccess to E-Mail via the Web".
"Middleboxes: Taxonomy and Issues," Internet Engineering TaskForce (IETF), RFC 3234 (Feb. 2002).
"MIME (Multipurpose Internet Mail Extensions): Mechanisms forSpecifying and Describing the Format of Internet Message Bodies," Internet Engineering Task Force (IETF), RFC 1341 (Jun. 1992).
"Think Your Deletions are Gone Forever? Think Again! ezClean Makes Metadata Removal Easy!"
3B Clean: What is the Problem? 3B is the solution.
3B Transform from 2005.
3BOpen Doc Making StarOffice and OpenOffice.org a viable option.
3BOpenDoc—Convert documents to and from OSF.
Bitform Extract SDK Jan. 2005.
EZclean version 3.3 Installation Guide and Admin Manual.
EzClean version 3.3 Integration Guide for use with CS MailSweeper for SMTP.
Silver, Michael A.; MacDonald, Neil. Plan to Deal with Metadata Issues with Windows Vista. Gartner, Inc.. Dec. 21, 2005.ID No. G00136321.
"Simple Mail Transfer Protocol," Internet Engineering Task Force(IETF), RFC 821 (Aug. 1982).
Jain, Pravin. The class of JAVA. Aug. 12, 2010.
Workshare Ltd. Workshare Protect 4.5 Admin Guide, (c) 2006.
Classification Definitions Class 715, Data Processing: Presentation Processing of Document, Operator Interface Processing, and Screen Saver Display Processing; Feb. 2011; pp. 1-33.

* cited by examiner

| User ID 1 | Access Time Stamp | Version ID | Flag | Parent Pointer |
| --- | --- | --- | --- | --- |
| User ID 2 | Access Time Stamp | Version ID | Flag | Parent Pointer |
| User ID 3 | Access Time Stamp | Version ID | Flag | Parent Pointer |
|  |  |  |  |  |

| Sales[1] | Expenses[2] | Profit[3] |
|---|---|---|
| £10,000,000[4] | £7,500,000[5] | £2,500,000[6] |

(Sales, Expenses, Profit, £10,000,000, £7,500,000, £2,500,000 shown with strikethrough)

SYSTEM FOR TRACKING CHANGES IN A COLLABORATIVE DOCUMENT EDITING ENVIRONMENT

FIELD OF INVENTION

The present invention generally relates to the field of digital document review. More particularly, the present invention relates to methods and systems for detecting changes and/or differences between an original document and a modified version of the document, especially where the two versions of the document are encoded in different formats of document representation.

BACKGROUND

In several scenarios, one or more users may go through multiple revisions of a document to improve the content and presentability of the document contents. As a result of their being more than one user authorized to access and modify a document, other users may become confused when requesting to see a document if they are not aware that the document has changed and how. In doing so, a user may wish to compare a latest version of the document with a prior version to determine the changes that have been made to the latest version. Other limitations of existing or prior systems will become apparent to those of skill in the art upon reading the following Detailed Description.

At least one embodiment of this invention pertains to a document management service that enables a user to request a document from the service to be delivered to a remote computer and have the service compare the last version of the document that the user accessed with the latest version and to deliver a display document showing those changes The document management service may run as a standalone service on a user's computing device or, in some instances, may run as a web service on a remote server. In either scenario, the document management service receives as input a request for particular document that a user wishes to see. The system also stores versions of the document as separate data files. These can be compared to show the revisions more plainly. These and other objects, features and characteristics of the present invention will become more apparent to those skilled in the art from a study of the following detailed description in conjunction with the appended claims and drawings, all of which form a part of this specification. It should be understood that the description and specific examples are intended for purposes of illustration only and not intended to limit the scope of the present disclosure.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

FIG. 6. Example change report.

DETAILED DESCRIPTION

Figure 1:
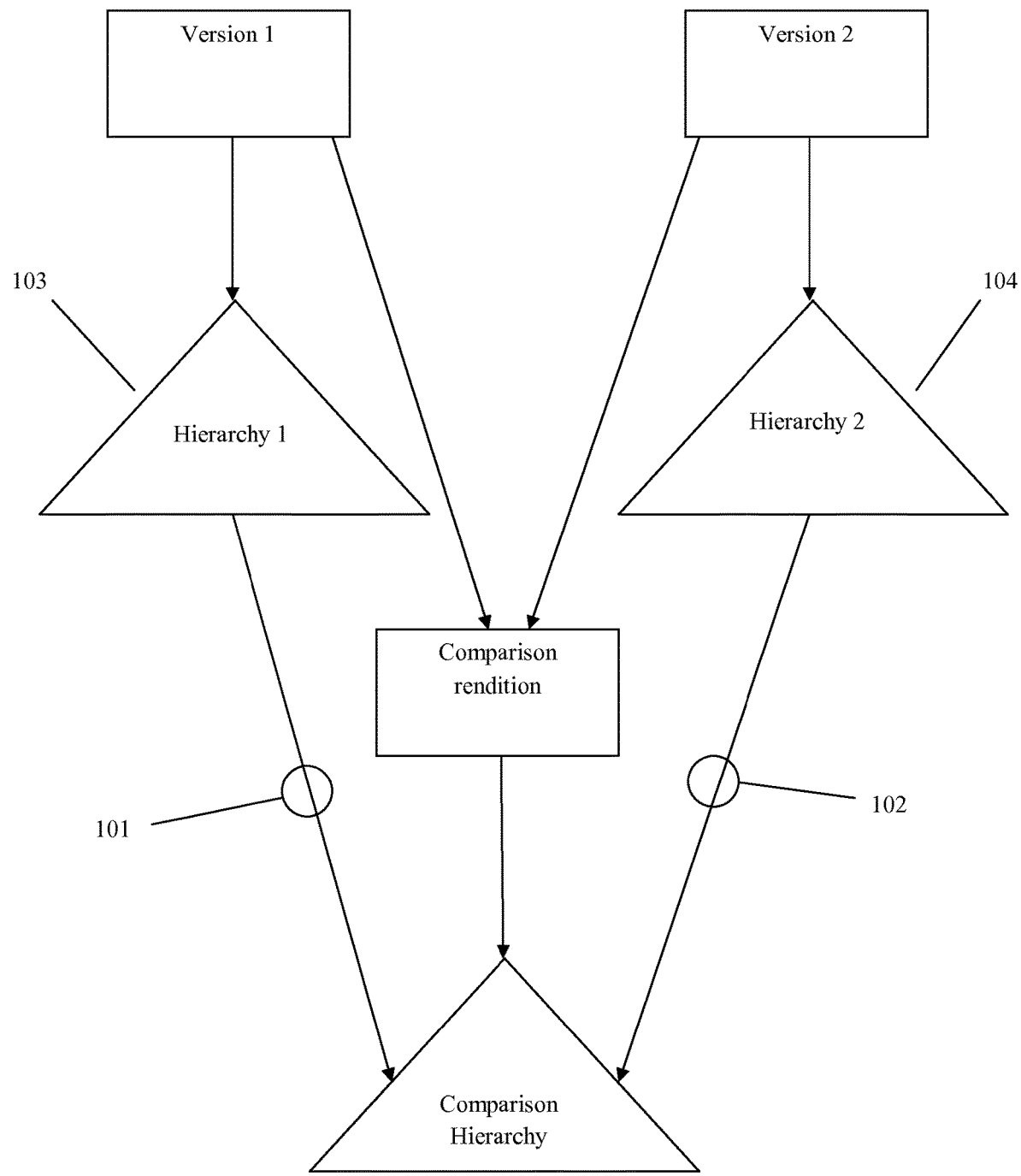
FIG. 1. Schematic showing comparisons of two versions.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The method and system operates on one or more computers, typically using one or more servers and one or more remote user's computing devices. A customer's device can be a personal computer, mobile phone, mobile handheld device like a Blackberry™ or iPhone™ or a tablet device like the iPad™ or Galaxy™ or any other kind of computing device a user can use to view and edit an electronic document. The user devices are operatively connected to the remote server using a data network. The invention does not require that the data network be in continuous contact with the remote file server. The invention works in conjunction with a document collaborative editing system (CES) or document management systems, (DMS) or both. For brevity, references to the DMS in the disclosure may disclose processes that may be performed by the CES or the CES in combination with the DMS. The system can be embodied in a client/server architecture, whereby an executable code operates on the user's remote device and interacts with processes operating on a server. In other embodiments, the same system can be running on the user's remote device by means of scripts or apps that are downloaded and executed within an Internet web-browser.

The user's remote computer is operatively connected to a data communication network, typically the Internet. This may be directly or indirectly through another network, for example a telephone network or a private data network. The user operates a client software on their computing device that communicates with the server that operates the process as a service, or the server that delivers documents for editing or review, that is the DMS or CES.

When the client requests to view a document available on the DMS, the request is received and processed on the DMS. In this case, the user's device may select a document title from a graphical user interface displayed on the screen of the device. The DMS maintains all of the revisions of the document in its data storage repository. Each time the CES saves a new version, that is a new computer file. That new file typically has a different filename than the prior version. The system also keeps track of the date and time that the version was stored. The system maintains a separate database that keeps track of each user authorized to access the document on the CES and their access of the document. Once the compared document is presented to the user, the user can make changes to the document and save it as yet a newer version When a new version of the document is created, it's a distinct document data file.

Document management and collaborative systems tend to only allow serial editing of documents—that is to say that only a single user may be actively editing a particular document at one time.

Figure 3:
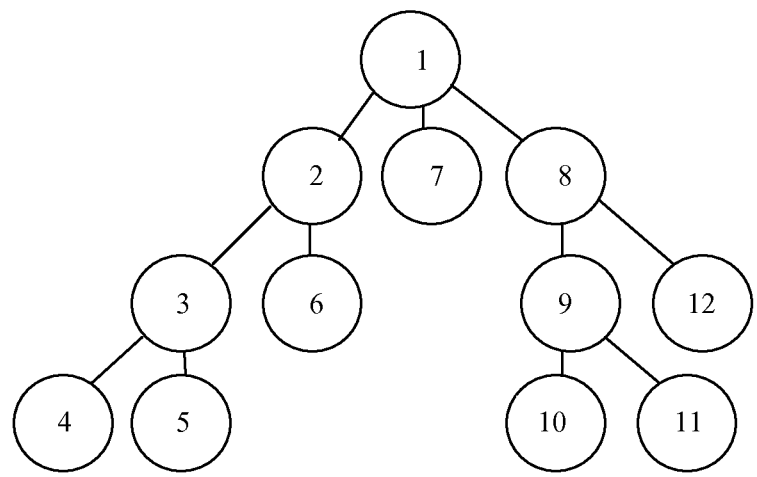
FIG. 3. Example document revision history as a tree structure.

Some systems such as document management systems (DMS) tend to enforce this workflow by providing locking operations—in order to edit a document a user must check out or lock the document, which prevents other users from accessing it except in 'read-only' mode. In this embodiment, the system works with a document where for any version of the document, there is one parent version and one child version, except for the first version and the last version. See FIG. 3.

Other systems do not enforce locking but use a 'first writer wins' approach which allows two users to begin editing the document at once, but only the first to save will be allowed to save their changes as a new version. The second user to try to save will be informed that they are unable to do so. Here the serial editing requirement is still enforced, but at the point of saving rather than opening the document. This requires less overhead for the user and is a more natural flow in most cases where there is no conflict. However in the case where there is a conflict, the user who tries to save second has already expended time and effort on editing the document and may be frustrated by their inability to save their work as a new version.

Another approach is to use a 'last writer wins' approach—in this case parallel editing is allowed but ignored by the system. Multiple users are allowed to open and edit the document at once and all saves are accepted, but the system only tracks versions as a single, linear list. If two editors are changing the document at once, the changes of the editor who saves first will be overwritten by those of the editor who saves later. Providing the system maintains a history of content of versions of the document, the changes made by the first editor are not lost irretrievably, but the fact that they have been overwritten may not be noticed and even if it is noticed, integrating these changes into the newer versions of the document may require considerable time and effort.

Parallel review, where two or more editors can simultaneously make changes to documents, or editors can make changes to older versions of the document, is usually disabled because of the difficulties of merging these changes back into a definitive latest version of the document. In this embodiment, the system may have versions of the document where a document may have one parent, but more than one child version. This occurs when a version of the document is opened by two different users who then save their versions of the document as distinct versions. See FIG. 4. While automated techniques for merging changes from different versions of text documents have existed for some time (and are widely used for managing changes to computer source code files), there have been fewer options available for performing the same process on word-processing documents.

Microsoft Word provides a different approach to merging two versions of a document—a comparison technique labeled 'Combine Documents'. This can compare two versions of a document from different branches of the version tree and label changes made in each with the author who made the changes. The changes can then be applied selectively as they are presented as track changes within word. Normally when comparing documents from two different branches of the version tree there is a problem with identifying in which branch a change was made—for instance if the text 'Once upon a time there were three bears' is present in the version from branch A, but not in the version from branch B, there is no way to tell if the text was inserted by the editor of branch A or was originally in an older version of the document but was deleted by the editor of branch B. Word gets around this problem by attaching identifiers termed 'Revision Sequence IDs' or 'RSIDs' to each block of text in the document. A new, random, RSID is used for each editing session of the document and a list is stored in the document. If a block of text such as the 'three bears' example above is found to have a RSID that is listed in both documents RSID history, then the block must have existed in a version of the document before the two branches diverged—this would mean that its absence from branch B indicates that it was deleted in that branch. Conversely, if the RSID for that block of text only exists in the list for branch A, then it must be an insertion in that branch. The technique used by Microsoft Word has limitations—for instance modifications of the document by another tool that does not insert RSIDs for new edits will confuse the system. Additionally, it is only possible to bring together changes from two versions at a time and the process must be performed on a computer running Microsoft Word, and so is not suitable for use in a server or cloud based offering.

The aim of this invention is to provide the ability to build a flexible, easy to use system for suggested merging changes from one or more versions of a word-processing document into another, target, version of the document. The invention is designed to be capable of being run either in a server environment—perhaps presented via a web interface, or running locally on a client computer.

Outline of Solution

For best results, the solution requires a content store which maintains the data describing past versions of the document. In addition to storing the content, the following metadata associated with each version is stored. See FIG. 5.

Parent Version—a link, by Id or otherwise indicating the earlier version of the document from which a particular version is derived Author—the name of the person who created the version—the person who made the changes between that version and its parent version A merged flag—indicating that changes in a particular version have already been merged into the master version of the document at some earlier point in time. This means that changes in an already merged version need not be included in future merging operations.

Creation date—the date and time at which the document version was created or added to the store The main merging procedure may be carried out in the absence of this metadata, and in fact in the absence of a versioning content store by (for instance) the reviewer being requested to manually select files containing the different versions of the document to operate on and the relationships between those versions. It is assumed for purposes of explanation that all of the versions and associated metadata are available from some form of content store.

Determining the Versions to Show Changes from Contributions:

First the system fetches from the database a list of all available versions of the document to be worked on. One version is chosen as the 'working version'. This version is the version to which changes from other versions will be applied. The reviewer may be allowed to select which version is to be used as the working version, or the working version may be chosen according to some rule—for instance the most recent version or the most recent version created by the reviewer who initiated the merge process.

Once the working version is selected, the remaining versions are divided into two categories—already merged versions and possible contributions. The Already Merged versions category consists of all versions which are either a) direct ancestors of the working version or b) marked as already merged by the merged flag being set. The Possible Contributions category consists of all other versions. This category consists of all the versions that may contain changes that need to be merged into the working version. Typically, this will be versions of the document that are related to a common ancestor but are not ancestors of the working document.

Figure 4:
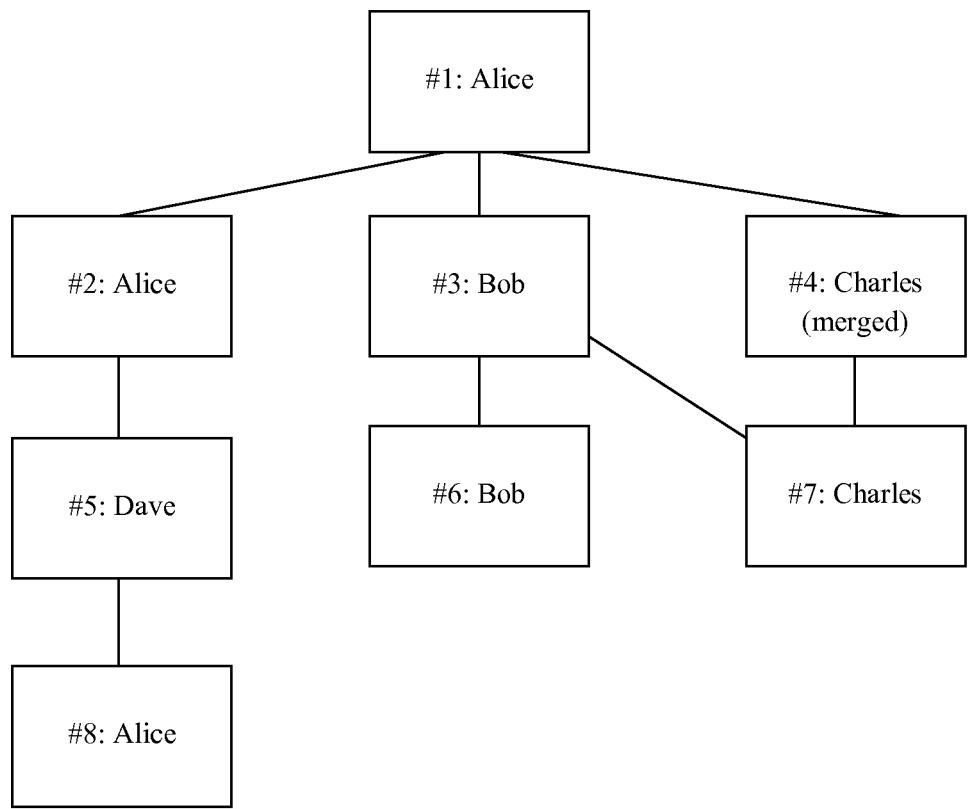
FIG. 4. Example document revision history schematic
FIG. 5. Example metadata storage.

The possible contributions category is now narrowed further to obtain the set of actual contributions. In order to do this any version created by an author that has a child version in the set of possible contributions created by the same author is all merged into one possible contribution. Rather than presenting as two or more different sets of changes created by same author, the single author's changes are presented to the reviewer as one set of revisions presented by the author. Referring to FIG. 4, the system is adapted to present the revisions between the original version 1 and version 3 combined with version 6. We combine the changes of the same author, if they have not been flagged merged. We would not show changes between 3 and 1 again. This step ensures that if an author saves multiple versions to the system while working, his changes appear as a single set of changes in the system rather than two or more sets. For each version in the set of actual contributions, a reference version is chosen—this is the version that the contribution version will be compared against to determine the changes made by the author of the contribution. The reference version is the closest ancestor version of the contribution that is either authored by a different author to the contribution or a member of the 'already merged versions' category. An alternative approach can be taken where no versions are discarded from the possible contributions category—i.e. the set of actual contribution versions is identical to the set of possible contribution versions. In this case the reference version for each contribution should be its parent version, and multiple versions created by the same author will appear as separate sets of changes.

The process will be explained in the context of FIG. 4. Version #4 by Charles is already flagged as having been merged. Alice begins the merge/review process and version #8 is selected as the working version by the system. The already merged contributions category is determined to be #1, #2, #5 and #4. The first three because they form the direct ancestry of the working version (and therefore changes made in them are already in the working version) and the last because it is marked as already merged in its metadata (presumably as the result of a previous merge/review operation).

This leaves the set of possible contributions as being #3, #6 and #7. From this set, #3 is dropped as it is authored by Bob and also has a child version that is also a possible contribution and also authored by Bob. Thus the set of actual contributions consists of versions #6 and #7. For each of these a reference version must be chosen. In the case of #7, the reference version is chosen as #3, since it is the nearest ancestor version authored by a different user. In the case of version #6, the reference version is #1 as it is the nearest ancestor that is either authored by a different user or part of the already merged category (in this case it's both).

So, for the version tree in FIG. 4, we have 2 possible sets of changes to allow the reviewer to apply, changes made by Bob (version #6 compared against version #1) and changes made by Charles (version #7 compared against version #3). The system may choose to automatically calculate both sets of changes and display them to the reviewer or prompt the reviewer with a list of possible contributions to include and allow them to select which ones to use. It's worth noting, once again, that it's possible for the contribution versions, reference versions and working version to be chosen in other ways to that outlined above—for instance the reviewer could select them manually.

It's also possible to use the system in a very simplified form where there are only two versions of interest in the version tree—the original (parent) version and the modified (child) version. In this case, if the original version is chosen as the working version, and the single contribution consists of the modified version against a reference version which is also the original version, the system then allows the reviewer to selectively choose which of the changes made to the document in the modified version to keep and which to discard.

Determining the Changes from Each Contribution

A document comparison engine can be used to determine the changes made in each contribution by comparing the contribution version against the reference version. Document comparison includes string matching algorithms, which can be further improved by ignoring certain characters, for example, spaces, carriage returns and line feeds, and certain other formatting characters. The outputs from this comparison process should include a machine readable representation of the full result of the comparison, including the text and structure of the redline document and annotations to indicate which parts are inserted, deleted etc. The content of the document is thereby more than simply text, but includes formatting data, insertion indications, deletion indications, document structure control data like tables, cells, footnotes and other data that an application can use to render the document as the author intended. In one embodiment, output is encoded in XML format. The output of the comparison may also include a redline document in a file format associated with word-processing documents, for example, .DOC, .DOCX, or .RTF, which can be displayed to the reviewer by means of the appropriate word processing or viewing software.

Displaying Changes to the Reviewer

At this point the system may optionally collect additional information about each change by determining the location where the change would be applied in the working version of the document. This location is determined as follows:

The location of the change in the reference version for the contribution is determined by mapping from the redline for the contribution to the content of the reference document in a hierarchical manner further described below.

This location in the reference version is then tracked to the equivalent version in the working version.

Determining the location of each change in the working version enables the additional information to be shown to the reviewer when they are presented with the changes. This information includes:

Changes that clash with each other by acting on the same area of the working version of the document—these are detected by finding changes where the ranges they would apply to in the working version overlap.

Changes that duplicate each other, because they would end up making the same change at the same location in the working version Changes that cannot be applied (because for some reason the location in the working version cannot be determined, or has been removed—for instance a change to the wording of a footnote that has already been deleted in the working version).

Changes that need not be applied because they have already been effected in the working version—for instance a deletion where the range for the change location in the working version is reduced to a single point—this indicates that the text has already been deleted in the working version.

The changes may be ordered by their position in the working version when displayed, grouping changes that are applied to the same area of the working version together.

Figure 6:
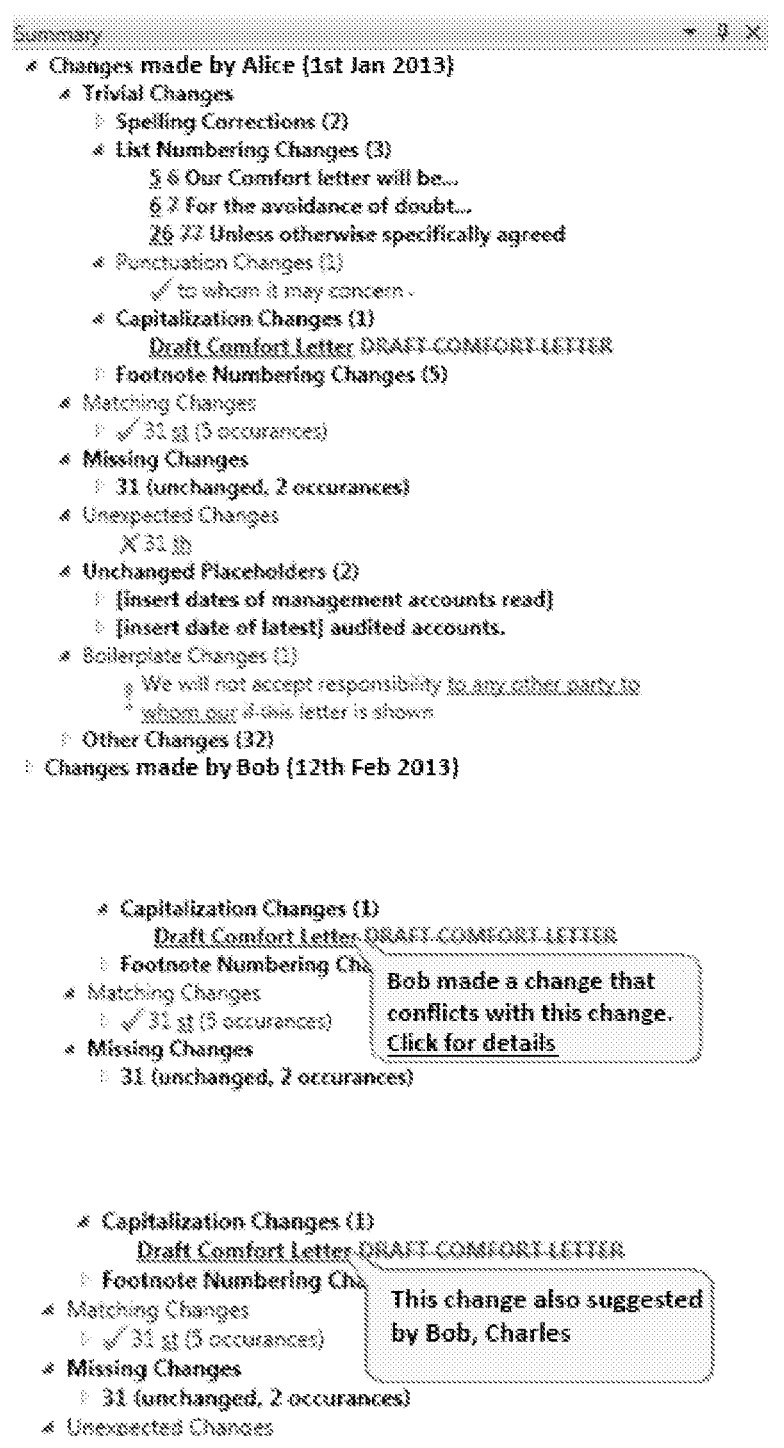

With or without this additional information, the changes need to be presented to the reviewer, so that he or she can select which changes to apply. This presentation could be in the form of a web page if the system is hosted on a server, or user interface within an application if the system is running on computer, or possibly within an app on a smart phone or tablet. See FIG. 6. In the case of display on a smart phone or tablet, it is possible that the calculations of all changes to be shown and the additional information associated with them would be performed on a server and the result of this calculation downloaded to the app in the form of XML, JSON or some other data format transmitted over the network.

The presentation of changes may take the form of a simple list, grouped by contribution, or a categorized arrangement as described in U.S. Pat. App. No. 2012/0136862, to Robin Glover, incorporated herein by reference, or alternatively, ordered according to their position in the working version if such information is made available. Additionally, the system may display the whole or fragments of the redline document along with the summary of changes to give the reviewer a better insight into the context in which the changes are being made.

It may be possible for one of several different views of the changes to be selected or switched between by the reviewer. Where additional information is attached to each change, this may be displayed to the reviewer in association with the display of the change itself or when the reviewer interacts with the change—for instance using a 'tooltip' to show associated information when the reviewer hovers the mouse cursor over the change. For each change that can be applied, the reviewer should have some method of indicating whether they want to apply the change—one example of this could be to place a checkbox next to each change which can be ticked by the reviewer to indicate that the change should be applied to the working version. The fact that a change cannot be applied for some reason may be indicated to the reviewer by disabling the action of this checkbox and showing a tooltip when the reviewer attempts to interact with it showing the reason that the change cannot be applied.

Where changes from different contributions have been detected to duplicate each other, the user interface may automatically change the check state of the checkbox against all duplicates of a change when the checkbox of any one of them is altered. Where changes conflict with each other the system may inform the reviewer by a tooltip, message box or other notification when they try to select two or more changes that are likely to conflict with each other.

The system may offer the reviewer the ability to save the selection state of the changes that they have already chosen to apply, close the app, application or web page and resume their work with the saved selections restored at a later time. In this case the system would have to not only save the selection information for all changes but the exact choices of versions for the working version, contributions and reference versions to allow an identical configuration to be recreated at the later time. Once the reviewer has finished selecting changes to be applied, they will have the option of carrying out the changes to the working version of the document by an appropriate interaction with the user interface—for instance pressing a button labeled 'Apply Changes'. At this point the apply process (detailed below) will take place to create a new, updated version of the document by applying the selected changes to the working version.

The system may allow the reviewer to do any or all of the following with this new version:

View it on a device, computer or in a browser

Open it for editing in an appropriate application

Save it to storage on the computer or device

Save it to the versioned file storage which the other versions were retrieved from—as a new version which will be a child of the working version.

Applying the Changes to the Working Version

The apply process begins with a set of input data consisting of:

Details of the working version of the document which changes are to be applied to Details of the contributions that have been selected and the reference versions which they have been compared to A list of changes that have been selected to be applied by the reviewer—This list could consist of a list of pairs of numbers—(contribution number, change number), (contribution number, change number) etc, or could identify the changes selected in some other way. The first two pieces of information ensures that the apply process can exactly reproduce the set of changes that were generated to be shown to the client, avoiding problems if (for instance) extra versions of the document have been created while the reviewer was deciding which changes to apply.

If the system calculated the position of changes in the working document, the apply process may be able to re-use the mapping information calculated. If the mapping information was not stored or is not available, then it can be re-calculated from scratched based on the input data for the apply process—i.e. the identity of the working version, the list of contribution and reference versions. This calculation process will need to access the content of the various versions from their storage location.

Since the apply process will make changes to the content of the working copy, the representation used to access the content of this document for mapping (the in memory hierarchical object model described further below) must support modification to the content of the document and the ability to re-save the modified content of the document. Various software libraries (including the OpenXML SDK from Microsoft) are capable of performing these operations. The entire process is made simpler if all versions of the document that need to be loaded to perform the apply operation (working version, contributions and reference versions) are all loaded using the same software library.

As described earlier as an optional step when displaying the changes to the reviewer, the mappings between different versions can be used to calculate the position of changes made in one version to the correct location in a later version of the document. See FIG. 1. This calculation is now performed for all changes that have been selected to be applied, and the location for the change in the working document is stored alongside each change. This location will be called the target location for the change. The target location may be a point in the document (for insertions) or a range between two points (for deletions). Each point in the document will be of the form of a reference to an object in the hierarchical object model representing the document, with (optionally) an offset within the object. For instance consider that an object may represent the following block of text within the document:
The quick brown fox jumps over the lazy dogs.

A range that identifies the word 'brown' would have a start point which references this object with an offset of 10 and an end point referencing the object with an offset of 15.

In addition to storing the change location in the working version for each change, the mapping process also needs to store the change location in the contribution document for each insertion (or move destination) change. This information allows the apply process to gather the text to be inserted and any style or formatting information to be brought along with it when the change is applied. This location will be called the change source location. As an explanatory example, the document hierarchy may be represented as a list of nodes, each entry having its own list of elements:
[versionXnodenum, content, location, childnodenum (1) . . . childnodenum(n)]

The comparison mapping between versionX and the redline is another list of entries, each entry having its own list of elements:
[versionXnodenum, redlinenodenum, location reference].

The system maps the content in the original by searching on content, retrieving the nodenum for that content. It then can look up in the mapping tree for that nodenum in the first entry and retrieve the redlinenodenum. It then can go to the version 2 mapping to redline, search on the redlinenodenum, retrieve the location reference and display the content at that location, and/or insert the content into the version2 node.

In order to apply changes which are deletions (or move source changes) to the working copy, the text within the target range for the change must be removed from the working copy of the document. In order to apply changes which are insertions (or move destination changes) to the working copy, the text that lies within the change source range must be copied from the contribution document and inserted at the target location in the working version of the document. Formatting information may optionally be brought from the contribution version to the working version of the document for the inserted text.

Each time a change is applied to the working version of the document, care must be taken to update the target locations for other changes that are still to be applied to take account of the change that has been made and ensure that the locations remain correct. In the example given earlier with a range that identifies the word 'brown' by offset within a longer block of text, if the application of another change deletes the word 'quick', the offsets of each end of the target range for the word 'brown' must be adjusted to subtract the number of characters removed to ensure that the word 'brown' is still targeted. The adjustment to change target locations may not be simply limited to changing offsets within an existing element in the document object model. Application of changes could lead to insertion, deletion, splitting or combining of elements in the document object model and change target locations must be updated to account for each of these actions if they occur.

Applying Structure Changes to the Document

Figure 7:
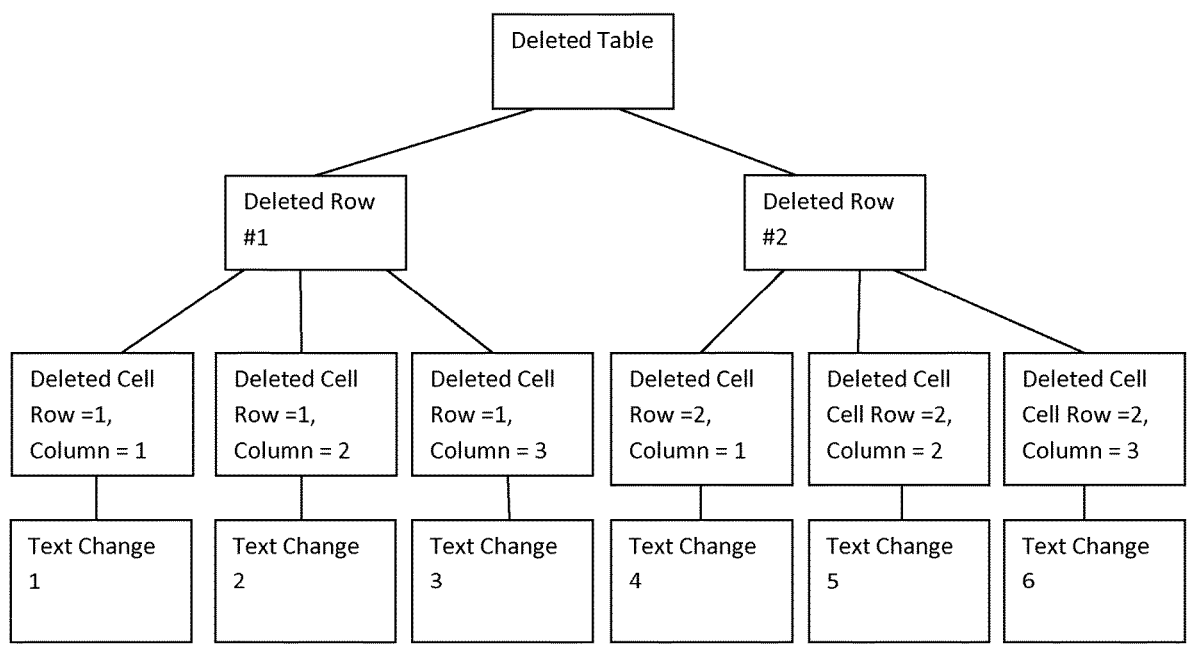
FIG. 7. Example structural change, the deleted table, and the hierarchical representation of the deletion.

As well as changing text within a document, an author can also make changes to the structure of the document—for instance they can insert or delete tables, rows, cells, footnotes, endnotes, headers, footers etc. If these changes are detected in the comparison progress and included in the machine readable comparison summary, then they can be applied to the working version of the document in a manner similar to the application of textual changes. See FIG. 7.

One approach would be to show these structural changes in the summary of all changes presented to the reviewer and allow them to select which changes to apply. This is simple but puts an extra workload on the reviewer requiring them to consider and select these changes and potentially allows the reviewer to select a contradictory set of changes—for instance they could select to apply text that is inserted within a new table but not to insert the table itself. A more satisfactory approach is to link the structural changes to the textual changes they contain, so that, for instance a deleted table row containing 3 textual deletions would be removed from the working copy of the document if (and only if) the reviewer selected to apply all 3 textual deletions in the row. The logic being here that if all the textual content within a piece of document structure such as a table, table row, footnote etc. is deleted then it makes sense to delete the (now empty) structure too. A slightly different rule applies for inserted structure—a piece of structure should be inserted into the working version of the document if any (rather than all) of the textual insertions within it are selected to be applied.

Tracking and Mapping Changes.

This application incorporates by reference the co-pending application to Robin Glover, titled "A Method and System for Comparing Documents Encoded in a Hierarchical Representation," filed on the same date as this application, docket number WS15.

Figure 2:
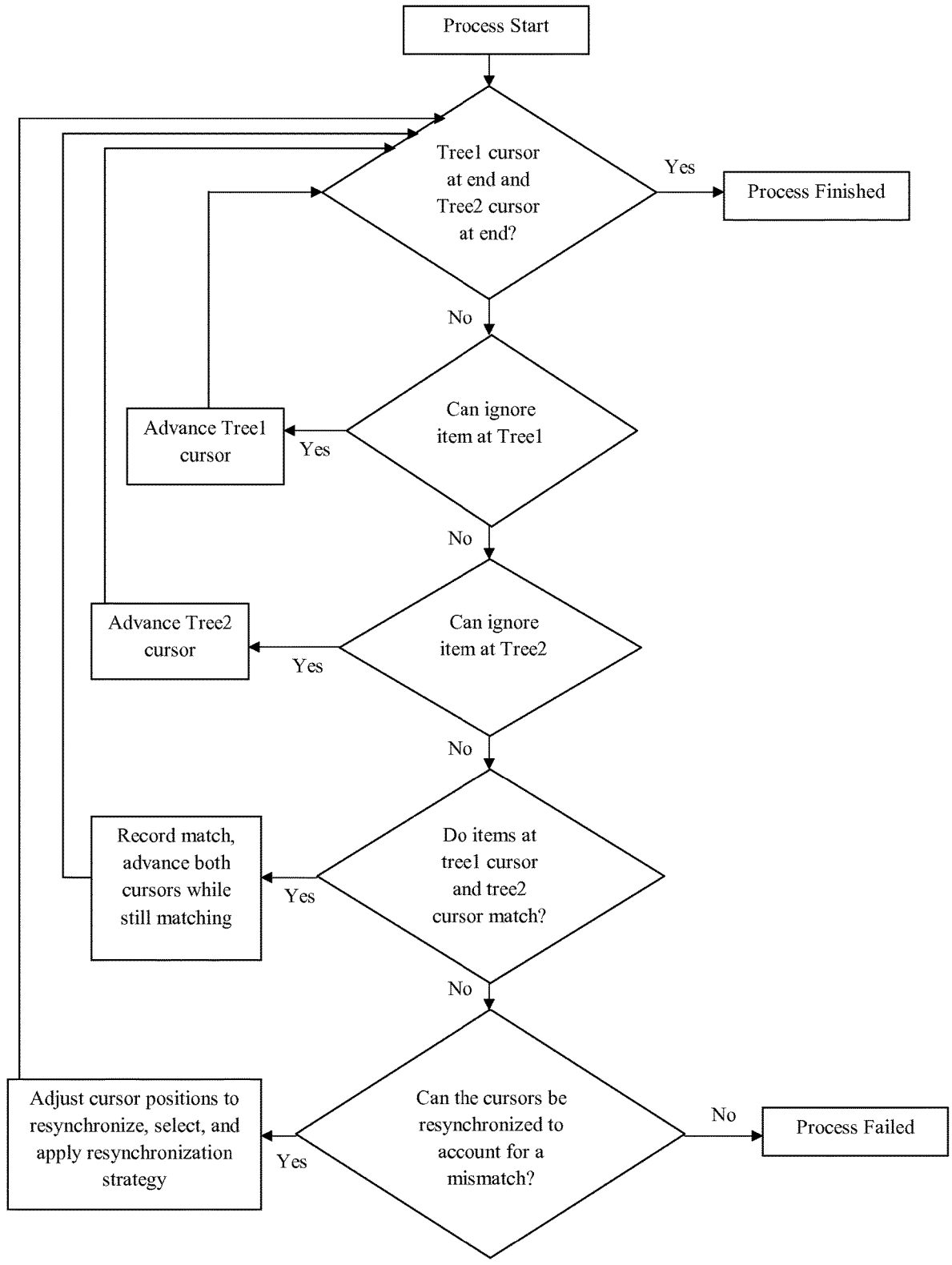
FIG. 2. Flow chart depicting the basic architecture of the process.

The solution works by maintaining a pair of cursors, one recording the position that the algorithm has reached in the first representation of the data and the other recording the position that the algorithm has reached in the second representation of the data. In one embodiment, these cursors begin at the root node of each representation and are advanced by traversing the tree in depth first order. FIG. 2. By cursor, it is also meant to include a pointer or other data object that an algorithm can use as the reference to a node in a tree data structure. The details of how each decision is made is dependent on the type of data represented by the two trees and how the tree structures differ. Where the types of data differ, then one cursor advances to the next node in the search while the other cursor remains at the same position. See FIG. 2. For instance in the case of two representations of a document, tree 1 (103) may contain nodes that represent the position of bookmarks in the document, while tree 2 (104) may not contain bookmark information. In this case, the decision 'can ignore item at tree1 cursor' would be yes if the tree 1 cursor is pointing to a bookmark node. The tree1 cursor would then be advanced past the bookmark node (without moving the tree 2 cursor) to allow the matching process to proceed.

In the case of the decisions as to whether the items at the cursors match, the logic is domain dependent. To give another document related example, in tree 1 a paragraph may be represented as a paragraph node with the text of the paragraph contained in its child node(s). In tree 2, the end of paragraphs may be represented by 'paragram marker' nodes which have no children and are sibling nodes to the nodes containing text. In this case the end of a paragraph node from tree 1 is taken to be a match for a paragraph marker node from tree 2, while the start of a paragraph node from tree 1 may be ignored.

In the case where the two nodes do not match at all, the process re-synchronizes. The re-synchronization stage exists to deal with minor mismatches between the content of the two documents that cannot be handled by simply ignoring items from one tree or another or allowing more flexible matching between the two trees. It can deal with situations such like 'sometimes we get an extra paragraph break from tree 2 which isn't in tree 1'. This situation cannot be dealt with by ignoring paragraph breaks from tree 2 (which would ignore all of them), or by allowing them to match to nothing in the matching stage, so it must be dealt with by the resynchronization stage.

Resynchronization is only attempted after normal ignoring and matching has failed. This ensures that items that can be matched will be in preference to them being skipped over by a resynchronization. That the ordering of the resynchronization stage after the ignoring and matching stages cannot move the cursors forward at a particular location is important. In practice, the resynchronization step consists of trying, in turn, each strategy in a list of resynchronization strategies that have been designed to deal with the differences between the two representations of the data. Each strategy is tested to see if it can deal with the current situation. If it can, the strategy takes steps to resynchronize the cursors, which may involve advancing one or both cursors and possibly recording a match. As soon as a strategy succeeds in advancing either cursor, the processing of the list of resynchronization strategies stops and the main algorithm returns to testing for ignores and matches. This ensures that possible matches are not missed due to unnecessary resynchronizations.

In general, resynchronization strategies will be attempted in order from the most simple and restrictive first to more complex and more generally applicable towards the end of the list. Some resynchronization strategies may just examine the nodes pointed to by the current cursor positions, others may 'look ahead' at nodes further on in the traversal of the tree or up the tree to the parent nodes of the current nodes to determine if they are applicable—for instance a strategy might only be applicable if the current location is within a table cell. Now the technique for hierarchical mapping can be applied twice—firstly between the original document hierarchy and the redline hierarchy and secondly between the modified document hierarchy and the redline hierarchy. The rules for what content is ignorable, how content should be matched and what resynchronizations to apply need to be based on the details of how the document and redline are represented in their respective object models, but the following basic rules need to be included:

When mapping the redline to the original (101), all elements in the redline marked as inserted (or move destination) should be treated as ignorable.

When mapping the redline to the modified (102), all elements in the redline marked as deleted (or move source) should be treated as ignorable.

By ignoring all inserted content from the redline, the structure and content of the remaining, un-ignored, redline elements should essentially match the structure and content of the original document, allowing for a successful mapping between the original and the redline content. Similarly ignoring deleted content when mapping the modified allows for a successful mapping between the redline and the modified document.

As a result of the two mapping procedures completing, there now exist correspondences between nodes in the redline hierarchy and the appropriate matching nodes in the original and modified versions of the document. A position or piece of content from the original document can be tracked to the equivalent location in the modified document by first following the correspondence from the node (or nodes) that represent the item in the original document to the equivalent nodes in the redline. (101) Then, it can be tracked from the node in the redline to the corresponding node in the modified version of the document. (102) The correspondence between the redline and the modified can then be followed to identify the nodes in the modified document that correspond to the starting content or position in the original document. For example, if an object needs to be positioned in the modified document, its location in the original can be mapped to the modified and then the object inserted into the modified with the appropriate position data so that it appears when rendered in the correct place. In cases of comments or other content, the content is not necessarily inserted, rather, its displayed or included with reference to the correct location in the modified document so that the second document is not changed, but rather displayed with an overlay, or reference.

Operating Environment:

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems. In some instances, especially where the mobile computing device is used to access web content through the network (e.g., when a 3G or an LTE service of the phone is used to connect to the network), the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Servers may be virtual servers, each an instance of software operating as an independent server but housed in the same computer hardware. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FOR-TRAN, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Also, while processes or blocks are at times shown as being performed in series, these processes or blocks may instead be performed or implemented in parallel, or may be performed at different times.

What is claimed:

1. A method for tracking locations of content in a document, said document comprised of content and said document being embodied by a first and second document version and data representing a first machine readable representation of the result of a comparison between the two versions, each of the first and second versions of the document being an individual data file, comprising:

generating for each of the first and second versions of the document, a corresponding first and second data structure embodying a corresponding first and second hierarchical representation of the content of the respective first and second versions of the document each comprising at least one node, said at least one node corresponding to a content data object comprising the respective version of the document and referring to a corresponding location in the respective version of the document and referring to at least one other node in the respective version of the document;

generating a third data structure representing a hierarchical representation of the the first machine readable representation of the result of a comparison, comprising at least one node, said at least one node corresponding to a content data object comprising the machine readable representation of the result of a comparison and referring to a corresponding location in the first machine readable representation of the result of a comparison;

for at least one piece of content comprising the first version of the document, generating a fourth data structure representing a mapping of data representing the location of the at least one piece of content in the first version of the document to data representing the location of the at least one piece of content in the second version of the document by determining a mapping from the data representing the location of the at least one piece of content in the first version of the document to data representing a location in the first machine readable representation of the result of a comparison and determining a mapping from the data representing the location in the first machine readable representation of the result of a comparison to data representing a location in the second version of the document.

2. The method of claim 1 where the determining a mapping step is comprised of sequentially comparing the content referenced by the nodes in the hierarchies of the first version and the first machine readable representation of the result of a comparison and sequentially comparing the content referenced by the nodes in the hierarchies of the first machine readable representation of the result of a comparison and the second version.

3. The method of claim 2 further comprising:
for each mapping, generating two cursors, each corresponding to a respective first and second hierarchies being mapped and each cursor referencing a first node from the first hierarchy and a second node from the second hierarchy;
making a first determination whether a data type associated with the first node may be ignored, and in dependence thereon, advancing the first cursor to the next node in a search sequence of the first hierarchy;
making a second determination whether a data type associated with the second node may be ignored, and in dependence thereon, advancing the second cursor to the next node in a search sequence of the second hierarchy;
in the case where the first and second determinations do not advance either the first or second cursors, making a third determination whether any of the contents of the first and second nodes match and in dependence thereon, storing in a data file data representing the matching contents.

4. The method of claim 1 further comprising:
using the determined mappings to cause content associated with a mapped location on the second version to be displayed as an overlay at the mapped location of the second version upon a condition that such location of the second version is displayed on the user's device.

5. The method of claim 3 further comprising:
modifying the second version by applying an edit represented by the mapped content at the location of the mapped content in the second version.

6. The method of claim 5 further comprising: creating a fifth data structure representing a merging of the four mappings.

7. The method of claim 1 further comprising:
generating a fifth data structure representing a hierarchical representation of the content in a third version of the document;
generating a second machine readable representation of the result of a comparison between the second version and the third version of the document;
generating a data structure representing a hierarchical representation of the content in the second machine readable representation of the result of a comparison; and
determining a mapping from the location of the content in the second version to the location of the content in the second machine readable representation of the result of a comparison and from the location of the content in the second machine readable representation of the result of a comparison to the location of the content in the third version of the document.

8. The method of claim 7 further comprising:
modifying the third version by applying the edit represented by the mapped content at the location of the mapped content in the third version.

9. The method of claim 1 further comprising: creating a fifth data structure representing a merging of the two mappings.

10. The method of claim 1 where the first and second versions of the document are data files of two different document encoding format types.

11. A method for tracking locations of content changes to a document, said document comprised of content and said document being embodied by a first and second version, each an individual data file, comprising:
generating a first and second data structure each embodying a corresponding hierarchical relationship among the content in each of the respective first and second versions of the document said first and second data structures comprising at least one node, said node corresponding to a data object comprising the respective version of the document and each node referring to a location in the respective version of the document and referring to at least one other node in the hierarchy of the respective version of the document;
generating a third version of the document comprising a first machine readable representation of the result of a comparison between the first and the second versions of the document;
generating a third data structure embodying a hierarchical relationship among the content comprising the first machine readable representation of the result of a comparison said third data structure comprising at least one node, said node corresponding to a data object comprising the first machine readable representation of the result of a comparison and referring to a location in the first machine readable representation of the result of a comparison; and
generating a mapping between node locations in the first and second versions of the document by using the third data structure to determine for locations of content in the first hierarchical representation of the first version of the document, the location of the content in the second hierarchical representation of the second version of the document.

12. The method of claim 11 further comprising:
determining the location of a content item in the second version of the document by means of using the location of the content item in the first version of the document as an input to a determination that uses the generated mapping in order to track the position of the content item to its modified location in the second version.

13. The method of claim 12 further comprising:
modifying the second version by applying the edit represented by the mapped content at the location of the mapped content in the second version.

14. The method of claim 11 where the generating a mapping step is further comprised of:
sequentially comparing the content referenced by the nodes in the hierarchies of the first version of the document and the first machine readable representation of the result of a comparison and sequentially comparing the content referenced by the nodes in the hierarchies of the first machine readable representation of the result of a comparison and the second version of the document.

15. The method of claim 14 where the sequential comparing step is comprised of selectively ignoring certain data comprising the content referenced by the nodes in the hierarchies.

16. A method for tracking changes to a document, said document comprised of content and said document being embodied by a first and second versions, each an individual data file, comprising:
generating a comparison output document of the first and second versions of the document;
creating three data structures representing three corresponding hierarchies of the content corresponding to the first and second versions of the document and the comparison output document, respectively, each data structure comprising at least one node, each said node corresponding to a data object comprising the respective first, second or third version of the document and referring to a location in the respective version of the document and referring to at least one other node in the hierarchy representing the respective version of the document;

generating a data structure embodying a mapping of locations of at least one nodes from the hierarchy of representing first version to locations of nodes in the hierarchy representing the comparison output document; and generating a data structure embodying a mapping of locations of nodes from the hierarchy representing the comparison output document to the corresponding locations of nodes in the hierarchy representing the second version of the document, where each mapping is for content at a content location in the first document that corresponds to content at a location in the second document.

17. The method of claim 16 where the creating step is further comprised of ignoring at least one insertion present in the comparison output document.

18. The method of claim 16 where the creating step is further comprised of ignoring at least one deletions present in the comparison output document.

19. A method for tracking locations of content in a document, said document comprised of content and said document being embodied by a first and second version and data representing a first machine readable representation of the result of a comparison between the two first and second versions, each of the first and second versions of the document an individual data file, comprising:

the step of generating for each of the first and second versions of the document, a corresponding first and second data structure embodying a corresponding first and second hierarchical representation comprised of at least one node comprising a corresponding at least one portion of the content of the document, said node comprised of data referring to a location in the respective version of the document and referring to at least one other node in the respective hierarchy;

the step of generating a third data structure representing a hierarchical representation of the content comprising the first machine readable representation of the result of a comparison, comprising at least one node, said node comprised of data referring to a location in the first machine readable representation of the result of a comparison;

for at least one piece of content present in the first version of the document, the step of generating a fourth data structure representing a mapping of the location of a node comprised of the at least one content to the location of the node comprised of an at least one corresponding content in the second version of the document by means of determining a mapping from the location of the node comprised of the at least one content in the first version of the document to a location of the node comprised of the corresponding at last one content in the first machine readable representation of the result of a comparison and a determining a mapping from the location of the node comprised of the at least one content in the first machine readable representation of the result of a comparison to the location of the at least one node comprised of the corresponding content in the second version.

20. A computer system comprised of computer memory adapted to track locations of content in a document, said document comprised of content and said document being embodied by a first and second version and a first machine readable representation of the result of a comparison between the two versions, each version of the document and the representation embodied by data stored in the computer memory, comprising:

a first component adapted to generate for each of the first and second versions of the document, corresponding first and second data structures embodying a corresponding first and second hierarchical representation comprised of at least one node corresponding to a data object comprising the content of the respective version of the document, said node comprised of data referring to a location in the respective version of the document and referring to at least one other node in the respective hierarchical representation;

a second component adapted to generate a third data structure representing a hierarchical representation of the content comprising the first machine readable representation of the result of a comparison, comprising at least one node, said node comprised of data referring to a location in the first machine readable representation of the result of a comparison;

a third component adapted to generate, for at least one piece of content present in the first version of the document, a fourth data structure representing a mapping of the location of a node comprised of the at least one piece of content to the location of the node comprised of the at least one piece of content in the second version of the document by means of determining a mapping from the location of the node comprised of the at least one content in the first version of the document to a location of the node comprised of the at least one first corresponding content in the first machine readable representation of the result of a comparison and a determining of a mapping from the location of the node comprised of the first corresponding content in the first machine readable representation of the result of a comparison to the location of the node comprised of a second corresponding at least one content in the second version.

21. The system of claim 20 where the third component is further adapted to sequentially compare the content referenced by the nodes in the hierarchies of the first version and the first machine readable representation of the result of a comparison and sequentially compare the content referenced by the nodes in the hierarchies of the first machine readable representation of the result of a comparison with the second version.

22. The system of claim 21 where the third component is further adapted to:

generate for each mapping, two cursors, each corresponding to a respective first and second hierarchies being mapped and each cursor referencing a first node from the first hierarchy and a second node from the second hierarchy;

make a first determination whether a data type associated with the first node may be ignored, and in dependence thereon, advance the first cursor to the next node in a search sequence of the first hierarchy;

make a second determination whether a data type associated with the second node may be ignored, and in dependence thereon, advance the second cursor to the next node in a search sequence of the second hierarchy;

in the case where the first and second determinations do not advance either the first or second cursors, make a third determination whether any of the contents of the first and second nodes match and in dependence thereon, store in a data file data representing the matching contents.

23. The system of claim 22 further comprised of a fourth component adapted to modify the second version by applying the edit represented by the mapped content at the location of the mapped content in the second version.

24. The system of claim 20 further comprising;

a component adapted to track the location of at least one comment from the first version to the second version by means of using the two determined mappings to identify the location of the comment in the second version.

25. The system of claim 20 where the first and second versions of the document are data files of two different document encoding format types.

26. The system of claim 20 further comprising:

a component adapted to use the determined mappings to cause content associated with a mapped location on the second version to be displayed as an overlay at the mapped location of the second version upon the condition that such location of the second version is displayed on the user's device.

* * * * *